(12) United States Patent
Lai et al.

(10) Patent No.: US 12,207,219 B2
(45) Date of Patent: Jan. 21, 2025

(54) NID PROVISIONING UNDER UE MOBILITY SCENARIOS

(71) Applicant: MEDIATEK INC., Hsin-Chu (TW)

(72) Inventors: Chia-Lin Lai, Hsin-Chu (TW); Yuan-Chieh Lin, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 272 days.

(21) Appl. No.: 17/558,298

(22) Filed: Dec. 21, 2021

(65) Prior Publication Data
US 2022/0232506 A1 Jul. 21, 2022

Related U.S. Application Data

(60) Provisional application No. 63/139,827, filed on Jan. 21, 2021.

(51) Int. Cl.
*H04W 60/00* (2009.01)
*H04W 8/02* (2009.01)

(52) U.S. Cl.
CPC ............ *H04W 60/00* (2013.01); *H04W 8/02* (2013.01)

(58) Field of Classification Search
CPC ......... H04W 60/00; H04W 8/02; H04W 8/18; H04W 60/04; H04W 8/12; H04W 76/11; H04W 8/20; H04W 8/22; H04W 8/26
See application file for complete search history.

(56) References Cited

U.S. PATENT DOCUMENTS

| | | | |
|---|---|---|---|
| 2019/0159157 A1 * | 5/2019 | Gupta | H04W 8/02 |
| 2020/0245235 A1 | 7/2020 | Chun | H04W 48/18 |
| 2021/0099968 A1 * | 4/2021 | Tiwari | H04W 60/06 |
| 2022/0124521 A1 * | 4/2022 | Xu | H04W 28/09 |
| 2022/0191813 A1 | 6/2022 | Yu | H04W 60/00 |

FOREIGN PATENT DOCUMENTS

| | | | | |
|---|---|---|---|---|
| CN | 108574969 A | 1/2018 | | |
| CN | 111465011 A | 1/2019 | | |
| WO | WO-2019075623 A1 * | 4/2019 | | H04L 41/00 |
| WO | WO2020037086 A1 | 8/2019 | | |

OTHER PUBLICATIONS

Taiwan IPO, office action for the Taiwanese patent application 111101223 (no English translation is available), dated Nov. 8, 2022 (13 pages).

* cited by examiner

*Primary Examiner* — Marisol Figueroa
(74) *Attorney, Agent, or Firm* — Helen Mao; Zheng Jin; Imperium Patent Works

(57) ABSTRACT

A method supporting enhanced network identity (NID) provisioning under User Equipment (UE) mobility scenarios between different types of networks is proposed. When a UE registers to an SNPN, the UE is assigned with a 5G-GUTI by the SNPN. The SNPN is identified by an SNPN ID==PLMN ID+NID. When the UE moves from the SNPN to another target network having a target AMF, the UE triggers a mobility registration update procedure and provides the 5G-GUTI along with NID information in a Registration Request to the target AMF. The target AMF can use the NID information along with the 5G-GUTI to find a source AMF for deriving UE context for the subsequent operations during the mobility registration update procedure. Providing NID information along with 5G-GUTI can assist the target AMF to find the source AMF efficiently, preventing a potential registration procedure failure.

18 Claims, 5 Drawing Sheets

NID PROVISIONING UNDER UE MOBILITY SCENARIOS

CROSS REFERENCE TO RELATED APPLICATIONS

This application claims priority under 35 U.S.C. § 119 from U.S. Provisional Application No. 63/139,827, entitled "NID Provisioning under UE Mobility Scenarios", filed on Jan. 21, 2021, the subject matter of which is incorporated herein by reference.

TECHNICAL FIELD

The disclosed embodiments relate generally to wireless mobile communication network, and, more particularly, to method of Network Identifier (NID) provisioning under User Equipment (UE) mobility scenarios.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include 2G GERAN (GSM) radio access network, 3G UTRAN (UMTS) radio access network, 4G E-UTRAN (LTE), 5G new radio (NR) radio access network, and other non-3GPP access RAT including WiFi.

As compared to PLMN, a non-public network (NPN) is a 5GS deployed network for non-public use. An NPN is either a Stand-alone Non-Public Network (SNPN), i.e., operated by an NPN operator and not relying on network functions provided by a PLMN; or a Public Network Integrated NPN (NPI-NPN), i.e., a non-public network deployed with the support of a PLMN. The combination of a PLMN ID and Network identifier (NID) identifies an SNPN. NID information refers to the entire NID value or partial NID value (e.g., the first digit of the NID value). A UE may be enabled for SNPN. The UE selects an SNPN for which it is configured with a subscriber identifier and credentials. The UE can have several sets of subscriber identifiers, credentials, and SNPN identities.

When a UE is moving within a PLMN or between the PLMNs, the UE triggers the mobility registration update procedure and provides a 5G Global Unique Temporary Identifier (5G-GUTI) to the target AMF of the target PLMN, to assist the target AMF to find the correct source AMF for retrieving the UE context for the subsequent procedures. However, a UE may move between different type of networks. For example, the UE may move within a PLMN, within a SNPN, between a PLMN and a SNPN, between two different PLMNs, between two different SNPNs, or between a PLMN and a SNPN. If the provided 5G-GUTI is assigned by an SNPN, the target AMF of the target network may not be able to find the correct source AMF since the derived information from the provided 5G-GUTI is not (globally) unique and may lead to find incorrect source AMF and finally the mobility registration update procedure may proceed to an un-anticipated exception condition or fail. As a result, the UE then needs to initiate an initial registration procedure.

The existing registration procedures need to be enhanced to resolve this issue.

SUMMARY

A method supporting enhanced network identity (NID) provisioning under User Equipment (UE) mobility scenarios between different types of networks is proposed. When a UE registers to an SNPN, the UE is assigned with a 5G-GUTI by the SNPN. The SNPN is identified by an SNPN ID==PLMN ID+NID. When the UE moves from the SNPN to another target network having a target AMF, the UE triggers a mobility registration update procedure and provides the 5G-GUTI along with NID information in a Registration Request to the target AMF. The target AMF can use the NID information along with the 5G-GUTI to find a source AMF for deriving UE context for the subsequent operations during the mobility registration update procedure. Providing NID information along with 5G-GUTI can assist the target AMF to find the source AMF efficiently, preventing a potential registration procedure failure.

In one embodiment, a UE registers to a stand-alone non-public network (SNPN). The SNPN is identified by a Public Land Mobile Network (PLMN) ID and a Network Identifier (NID). The UE determines that a 5G Global Unique Temporary Identifier (5G-GUTI) is assigned to the UE by the SNPN. The UE triggers a mobility registration update procedure and transmits a registration request to a target access and mobility function (AMF) of a target network. The registration request comprises the 5G-GUTI and NID information of the SNPN. The UE performs the mobility registration update procedure with the target network.

In another embodiment, a network entity (target AMF) receives a registration request from a User Equipment (UE) in a target network. The registration request triggers a mobility registration update procedure. The target AMF receives a 5G Global Unique Temporary Identifier (5G-GUTI) and Network Identifier (NID) information of a source network. The source network is a stand-alone non-public network (SNPN) identified by a Public Land Mobile Network (PLMN) ID and a NID. The target AMF determines a source AMF using the received 5G-GUTI and the NID information. The target AMF performs the mobility registration update procedure for the UE. The target AMF acquires UE context information from the source AMF.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
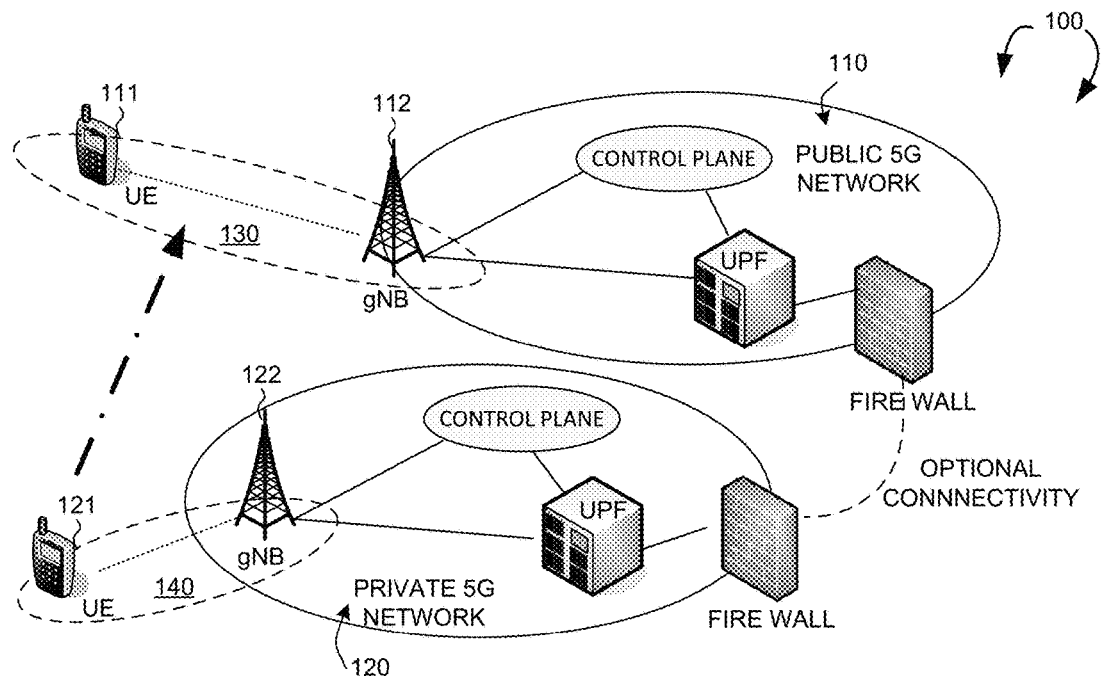
FIG. 1 schematically shows a communication system having a Public Land Mobile Network (PLMN) and a Stand-alone Non-public Network (SNPN) supporting enhanced network identifier (NID) provisioning under UE mobility in accordance with one novel aspect.

FIG. 1 schematically shows a communication system 100 having a Public Land Mobile Network (PLMN) 110 and a Stand-alone Non-public Network (SNPN) 120 supporting enhanced network identifier (NID) provisioning under UE mobility in accordance with one novel aspect. PLMN network 110 comprises control plane functionalities, user plane functionality (UPF), and application servers that provides various services by communicating with a plurality of user equipments (UEs) including UE 111. UE 111 and its serving base station gNB 112 belong to part of a radio access network RAN 130. RAN 130 provides radio access for UE 111 via a radio access technology (RAT), e.g. 3GPP access and non-3GPP access. An access and mobility management function (AMF) in PLMN 110 communicates with gNB 112, and other network functions such as Session Management Function (SMF), Authentication Server Function (AUSF), etc. in PLMN 110 (not shown).

Similarly, SNPN network 120 comprises control plane functionalities, user plane functionality (UPF), and application servers that provides various services by communicating with a plurality of user equipments (UEs) including UE 121. The combination of a PLMN ID and a Network identifier (NID) identifies an SNPN. UE 121 and its serving base station gNB 122 belong to part of a radio access network RAN 140. RAN 140 provides radio access for UE 121 via a radio access technology (RAT), e.g. 3GPP access and non-3GPP access. An AMF in SNPN 120 communicates with gNB 122, and other network functions such as SMF, AUSF etc. in SNPN 120 (not shown). UE 111/UE 121 may be equipped with a radio frequency (RF) transceiver or multiple RF transceivers for different application services via different RATs.

When a UE is moving within a PLMN or between the PLMNs, the UE triggers the mobility registration update procedure and provides a 5G Global Unique Temporary Identifier (5G-GUTI) to the target AMF of the target PLMN, to assist the target AMF to find the correct source AMF for retrieving the UE context for the subsequent procedures. However, a UE may move between different type of networks. For example, the UE may move within a PLMN, within a SNPN, between a PLMN and a SNPN, between two different PLMNs, between two different SNPNs, or between a PLMN and a SNPN. If the provided 5G-GUTI is assigned by an SNPN, it may not be a globally unique number. As a result, the target AMF of the target network may not be able to find the correct source AMF, since the derived information from the provided non-unique 5G-GUTI may lead to find incorrect source AMF. Therefore, the mobility registration update procedure may proceed to an un-anticipated exception condition or fail. The UE then needs to initiate an initial registration procedure with the target AMF.

In accordance with one novel aspect, a method of enhanced NID provisioning method is proposed to handle different UE mobility scenarios. When a UE registers to an SNPN, the UE is assigned with a 5G-GUTI by the SNPN. The SNPN is identified by an SNPN ID=PLMN ID+NID. When the UE moves from the SNPN to another target network having a target AMF, the UE triggers a mobility registration update procedure and provides the 5G-GUTI to the target AMF. For example, UE 121 moves from SNPN 120 to PLMN 110. Since the UE is aware of the SNPN ID when the UE registers to the SNPN, the UE knows that the 5G-GUTI assigned by the SNPN may not be globally unique. Therefore, the existing mobility registration update procedure is enhanced to allow the UE to provide the 5G-GUTI with NID information if the UE knows the 5G-GUTI is assigned by an SNPN. After receiving the 5G-GUTI and NID information provided by the UE, the target AMF can decides whether to initiate the Identity request/respond procedure based on the NID assignment mode. If NID is self-assigned value, the value of PLMN ID (of the 5G-GUTI)+NID may not be (globally) unique. Therefore, the target AMF may need to request the UE to provide UE SUCI/SUPI for the subsequent procedures. If NID is coordinated assigned value, the value of PLMN ID (of the 5G-GUTI)+NID is (globally) unique. Therefore, the target AMF can use the information along with 5G-GUTI to find the correct source AMF. In the example of FIG. 1, when UE 121 moves from SNPN 120 to PLMN 112, UE 121 triggers a mobility registration update procedure and provides its 5G-GUTI with NID information to the target AMF in PLMN 110, since UE 121 knows the 5G-GUTI is assigned by SNPN 120 and may not be unique. The NID information can assist the target AMF to find the source AMF in SNPN 120 efficiently, preventing potential failure of the mobility registration update procedure.

Figure 2:
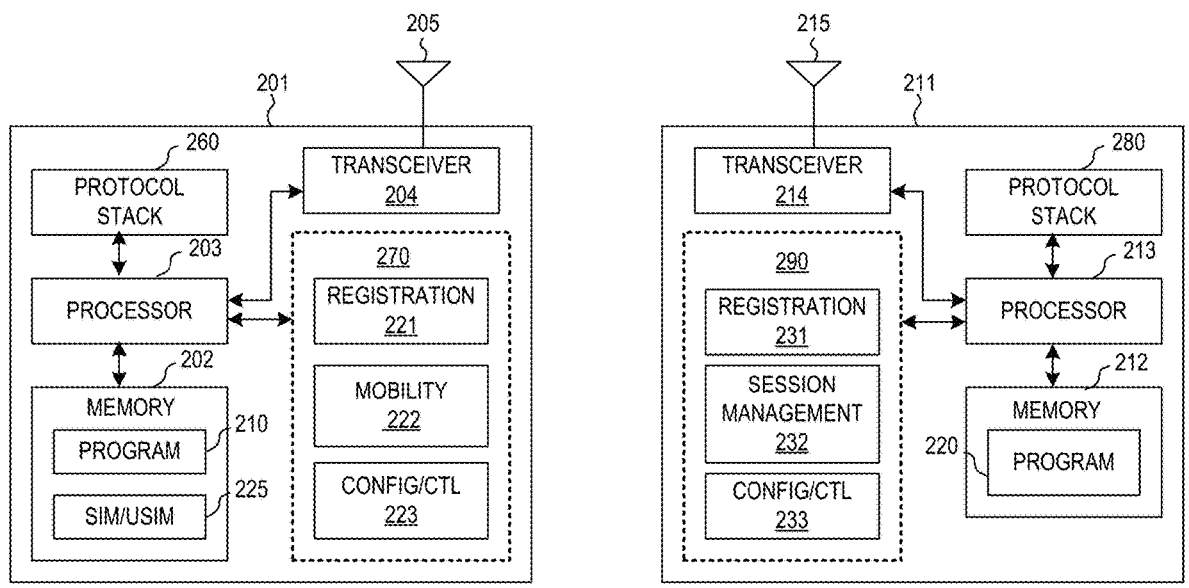
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session management circuit 232 handles session management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration procedure with the network, a mobility handling circuit 222 that handles mobility management, a config and control circuit 223 that handles configuration and control parameters.

Figure 3A:
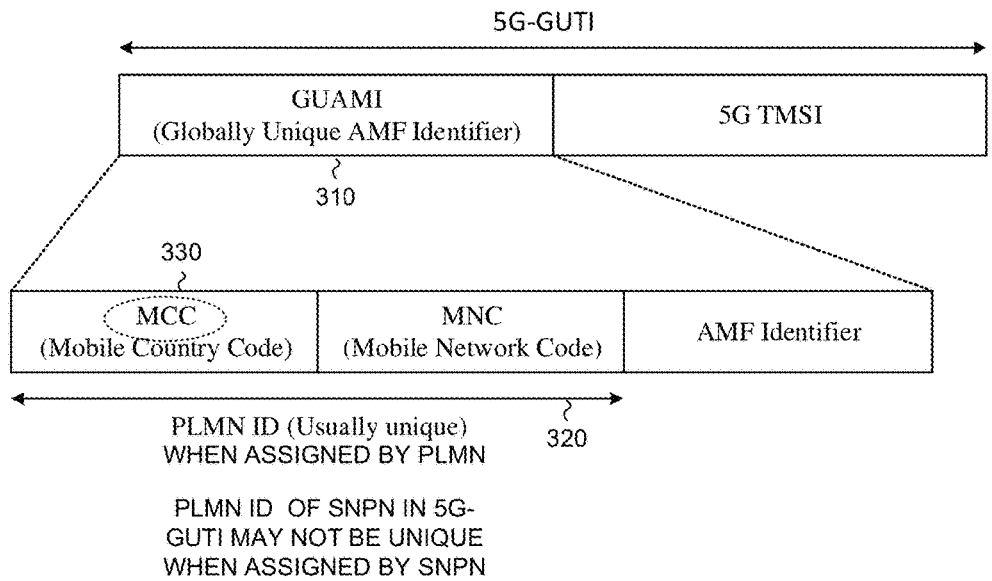
FIG. 3A shows the content of a 5G Global Unique Temporary Identifier (5G-GUTI), and examples when assigned by PLMN and by SNPN.

FIG. 3A shows the content of a 5G Global Unique Temporary Identifier (5G-GUTI), and examples when assigned by PLMN and by SNPN. A temporary user identity for 5GS-based services, the 5G-GUTI, is used for identification within the signalling procedures. Upon receiving a Registration Request message of type "initial registration" or "mobility registration update" from a UE, the AMF sends a new 5G-GUTI to the UE in Registration Accept message. Upon receiving a Registration Request message of type "periodic registration update" from a UE, the AMF sends a new 5G-GUTI to the UE in Registration Accept message. Upon receiving a network triggered Service Request Message from a UE, the AMF uses a UE Configuration Update procedure to send a new 5G-GUTI to the UE. The 5G-GUTI has two main components: the Global Unique AMF Identifier (GUAMI) and the 5G-TMSI that provides an unambiguous identity of the UE within the AMF(s) identified by the GUAMI. GUAMI further comprises two network identifiers: PLMN ID and AMF ID. PLMN ID comprises a mobile country code (MCC) and a mobile network code (MNC).

In case of PLMN, the assigned 5G-GUTI is globally unique. When UE moves between PLMNs, UE provides 5G-GUTI in Registration Request to Target AMF. Target AMF derives the information of GUAMI from the provided 5G-GUTI for finding Source AMF which allocates the 5G-GUTI to the UE. As depicted by 310, GUAMI (Globally Unique AMF Identifier) contains MCC (Mobile Country Code), MNC (Mobile Network Code) and AMF Identifier. MCC and MNC constitutes a PLMN ID 320 which is usually unique when assigned by PLMN. Therefore, Target AMF can use the unique GUAMI to find Source AMF for retrieving UE context. In case of SNPN, the PLMN ID of the SNPN in 5G-GUTI is unique within an SNPN, but may not be globally unique when assigned by SNPN. As depicted by 310, since the PLMN ID 320 of SNPN ID (which consists of PLMN ID and NID) may not be globally unique (e.g., the MCC 330 may be 999 assigned by any SNPN), Target AMF may not be able to find Source AMF using the derived GUAMI from 5G-GUTI assigned by SNPN. Mobility Registration Update procedure may fail. Therefore, when UE moves from SNPN to other network, UE provides 5G-GUTI along with NID in Registration Request to Target AMF. Target AMF derives the information of GUAMI from the provided 5G-GUTI using the provided NID for finding Source AMF which allocates the 5G-GUTI to the UE.

Figure 3B:
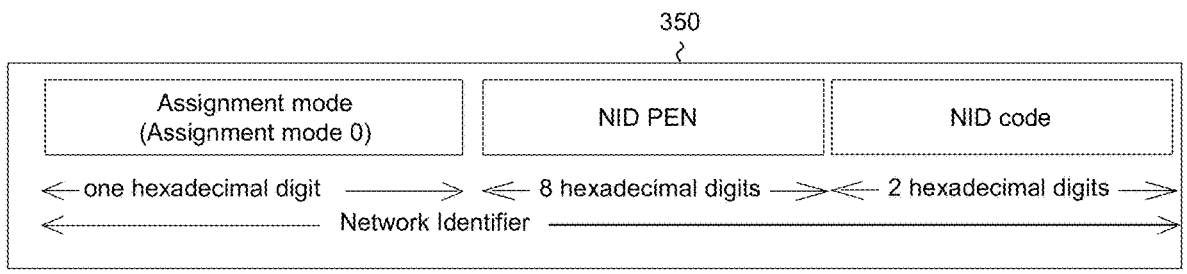
FIG. 3B shows one example of NID assignment based on different Assignment modes.

FIG. 3B shows one example of NID assignment based on different Assignment modes. As depicted in FIG. 3B, NID 350 comprises an Assignment mode, a NID PEN, and a NID code. The NID value can be determined based on different Assignment modes as specified in TS 23.003. For example, if Assignment mode is set to 0, then it means the NID is assigned globally unique independent of the PLMN ID of the SNPN. In another example, if Assignment mode is set to 2, then it means the NID is assigned globally unique with the combination of NID and PLMN ID. Note that the NID information here refers to the entire NID value or a partial NID value (e.g., the first digit of the NID value). Providing NID information along with 5G-GUTI can assist the Target AMF to be able to find the Source AMF efficiently, preventing a potential registration procedure failure. The target AMF can use the NID information along with 5G-GUTI to find the source AMF for deriving UE context for the subsequent operations during the mobility registration update procedure.

Figure 4:
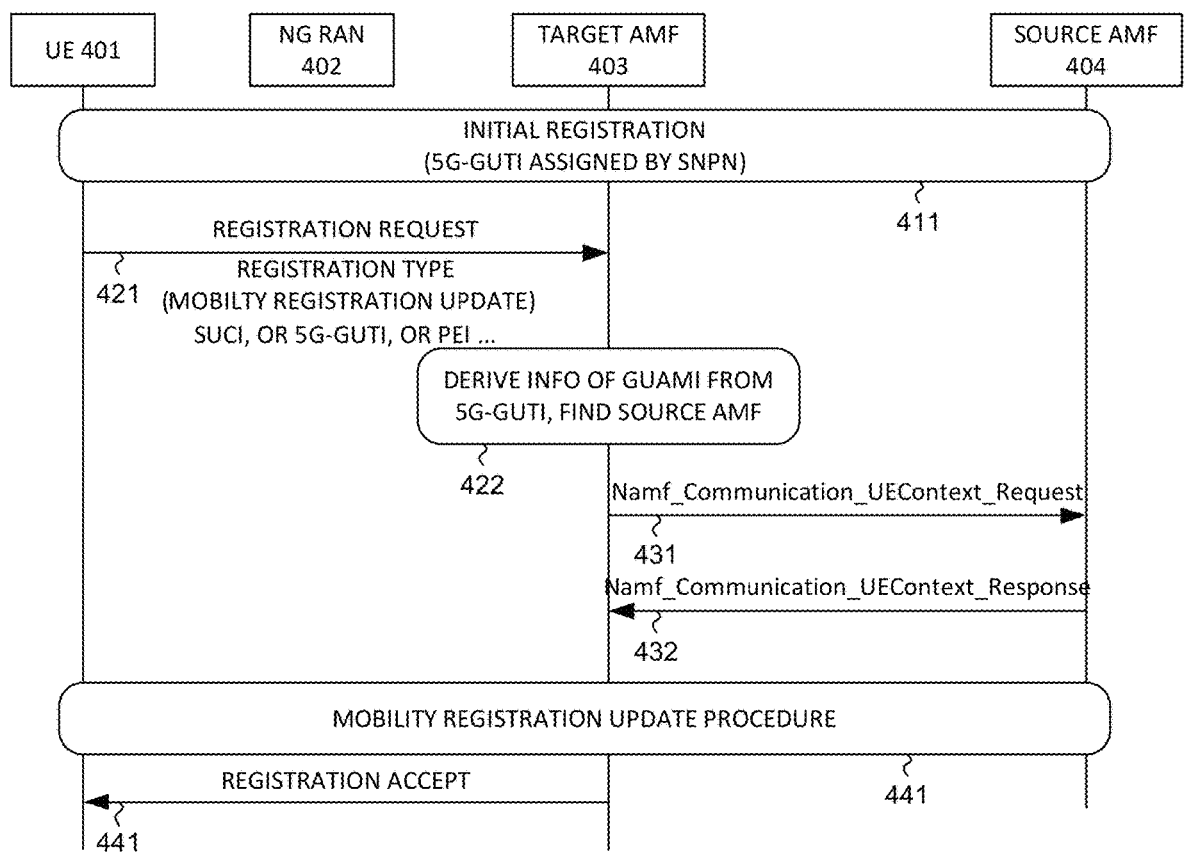
FIG. 4 illustrates a mobility registration update procedure where a UE moves from a source AMF to a target AMF, with enhanced NID provisioning in accordance with one novel aspect.

FIG. 4 illustrates a mobility registration update procedure where a UE 401 moves from a source AMF 404 to a target AMF 403, with enhanced NID provisioning in accordance with one novel aspect. In step 411, UE 401 performs initial registration in a source network, e.g., an SNPN having a source AMF 404. A UE needs to register with the network to get authorized to receive services, to enable mobility tracking and to enable reachability. The UE initiates the Registration procedure using one of the following Registration types: Initial Registration to the 5GS; Mobility Registration Update upon changing to a new Tracking Area (TA) outside the UE's Registration Area, or when UE needs to update its capability or protocol parameters, etc.; Periodic Registration Update (due to a predefined time period of inactivity); or Emergency Registration; or Disaster Registration; or SNPN Onboarding Registration.

Upon sending an initial registration request to the source AMF 404, UE 401 is assigned by the SNPN a 5G-GUTI, which may not be a globally unique number. The source SNPN can be identified by an SNPN ID, which comprises a PLMN ID and an NID. Later on, UE 401 moves to a target network, having a target AMF 403. The target network can be another SNPN or a PLMN. In step 421, UE 401 triggers a mobility registration update procedure or other NAS procedure. UE 401 may determine that its 5G-GUTI may not be unique, if it is assigned by the source network that is an SNPN. In response, UE 401 provides the 5G-GUTI together with the NID information of the source network to the target network during the registration procedure or the other NAS procedure using an existing NAS message or a new NAS message. In one example, UE 401 sends a Registration Request to the target AMF 403. The Registration Request comprises a Registration Type (e.g., Mobility Registration Update); SUCI or 5G-GUTI or PEI; Security parameters; additional GUTI; 4G Tracking Area Update; the indication that the UE is moving from EPS; PLMN with Disaster Condition. If the UE is registered with an SNPN, then the Registration Request further comprises the NID of the SNPN that assigned the 5G-GUTI.

In step 422, the target AMF 403 receives the registration request, derives information of GUAMI from the received 5G-GUTI, and finds the source AMF 404 accordingly. NID information may also be provided in the registration request. If NID is a self-assigned value (i.e. which value is set to 1 as specified in TS 23.003), the value of PLMN ID (of the 5G-GUTI)+NID may not be (globally) unique. Therefore, target AMF 403 may need to request UE 401 to provide UE SUCI/SUPI for the subsequent procedures. If NID is a coordinated assigned value, the value of PLMN ID (of the 5G-GUTI)+NID is (globally) unique. Therefore, target AMF 403 can use the information along with 5G-GUTI to find the correct source AMF. Upon finding the correct source AMF 404, in step 431, target AMF 403 sends a request (Namf_Communication_UEContext_Request) message to source AMF 404, requesting UE context information of UE 401. In step 432, source AMF 404 sends a response message (Namf_Communication_UEContext_Response) back to target AMF 403, providing the UE context information. In step 441, a MOBILITY REGISTRATION UPDATE procedure is performed between UE 401 and other network entities. In step 442, target AMF 403 sends a registration accept message to UE 401 to complete the registration update.

Figure 5:
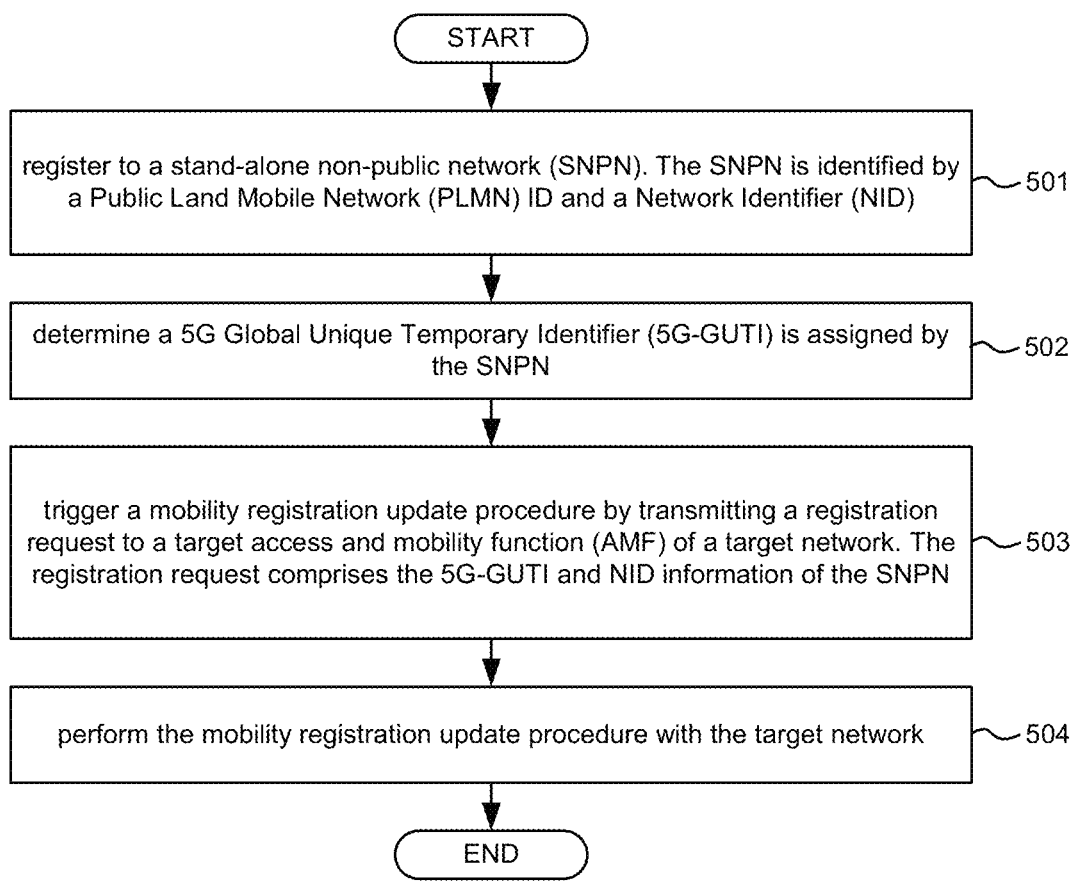
FIG. 5 is a flow chart of a method supporting enhanced NID provisioning under UE mobility scenarios between different types of networks from UE perspective in accordance with one novel aspect.

FIG. 5 is a flow chart of a method supporting enhanced NID provisioning under UE mobility scenarios between different types of networks from UE perspective in accordance with one novel aspect. In step 501, a UE registers to a stand-alone non-public network (SNPN). The SNPN is identified by a Public Land Mobile Network (PLMN) ID and a Network Identifier (NID). In step 502, the UE determines that a 5G Global Unique Temporary Identifier (5G-GUTI) is assigned to the UE by the SNPN. In step 503, the UE triggers a mobility registration update procedure and transmits a registration request to a target access and mobility function (AMF) of a target network. The registration request comprises the 5G-GUTI and NID information of the SNPN. In step 504, the UE performs the mobility registration update procedure with the target network.

Figure 6:
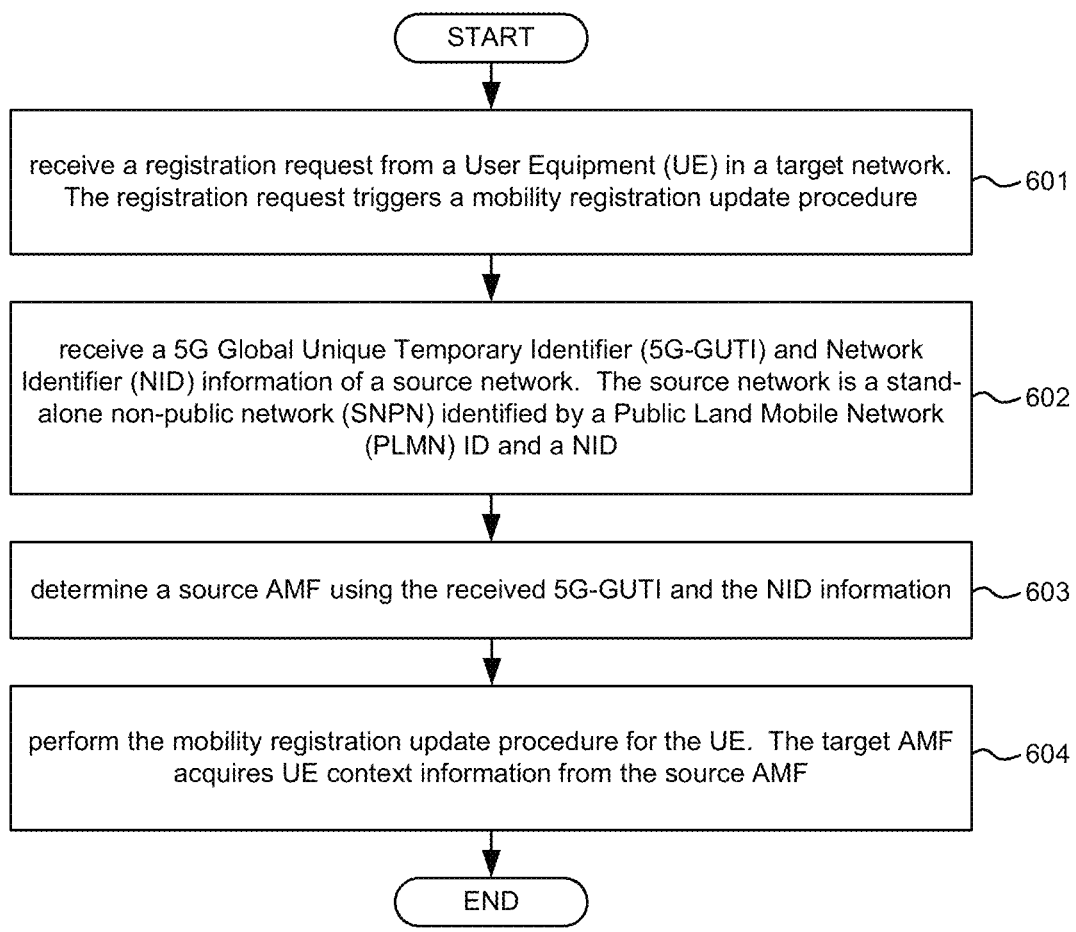
FIG. 6 is a flow chart of a method supporting enhanced NID provisioning under UE mobility scenarios between different types of networks from NW perspective in accordance with one novel aspect.

FIG. 6 is a flow chart of a method supporting enhanced NID provisioning under UE mobility scenarios between different types of networks from NW perspective in accordance with one novel aspect. In step 601, a network entity (target AMF) receives a registration request from a User Equipment (UE) in a target network. The registration request triggers a mobility registration update procedure. In step 602, the target AMF receives a 5G Global Unique Temporary Identifier (5G-GUTI) and Network Identifier (NID) information of a source network. The source network is a stand-alone non-public network (SNPN) identified by a Public Land Mobile Network (PLMN) ID and a NID. In step 603, the target AMF determines a source AMF using the received 5G-GUTI and the NID information. In step 604, the target AMF performs the mobility registration update procedure for the UE. The target AMF acquires UE context information from the source AMF.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   registering to a stand-alone non-public network (SNPN) by a user equipment (UE), wherein the SNPN is identified by a Public Land Mobile Network (PLMN) ID and a Network Identifier (NID);
   determining, by the UE, whether a 5G Global Unique Temporary Identifier (5G-GUTI) is assigned by the SNPN;
   triggering a mobility registration update procedure by transmitting a registration request to a target access and mobility function (AMF) of a target network, wherein the registration request comprises the 5G-GUTI and NID information of the SNPN, wherein the registration request comprises the NID information when the UE determines that the 5G-GUTI is assigned by the SNPN; and
   performing the mobility registration update procedure with the target network.

2. The method of claim 1, wherein the NID information refers to an entire NID value or a partial NID value of the SNPN.

3. The method of claim 1, wherein the 5G-GUTI comprises a Global Unique AMF Identifier (GUAMI) and a 5G Temporary Mobile Subscriber Identifier (TMSI), wherein the GUAMI further comprises a Public Land Mobile Network (PLMN) ID and an AMF identifier.

4. The method of claim 3, wherein the PLMN ID further comprises a mobile country code (MCC) and a mobile network code (MNC), and wherein the MCC is not globally unique when assigned by the SNPN.

5. The method of claim 1, wherein both 5G-GUTI and the NID information are both used to find a source AMF of the SNPN that assigns the 5G-GUTI to the UE.

6. A User Equipment (UE), comprising:
   a registration handling circuit that registers to a stand-alone non-public network (SNPN), wherein the SNPN is identified by a Public Land Mobile Network (PLMN) ID and a Network Identifier (NID);
   a control circuit that determines whether a 5G Global Unique Temporary Identifier (5G-GUTI) is assigned by the SNPN;
   a transmitter that transmits a registration request to a target access and mobility function (AMF) of a target network, wherein the registration request comprises the NID information when the UE determines that the 5G-GUTI is assigned by the SNPN; and
   a mobility handling circuit that performs a mobility registration update procedure with the target network.

7. The UE of claim 6, wherein the NID information refers to an entire NID value or a partial NID value of the SNPN.

8. The UE of claim 6, wherein the 5G-GUTI comprises a Global Unique AMF Identifier (GUAMI) and a 5G Temporary Mobile Subscriber Identifier (TMSI), wherein the GUAMI further comprises a Public Land Mobile Network (PLMN) ID and an AMF identifier.

9. The UE of claim 8, wherein the PLMN ID further comprises a mobile country code (MCC) and a mobile network code (MNC), and wherein the MCC is not globally unique when assigned by the SNPN.

10. The UE of claim 6, wherein both 5G-GUTI and the NID information are both used to find a source AMF of the SNPN that assigns the 5G-GUTI to the UE.

11. A method, comprising:
receiving a registration request from a User Equipment (UE) by a target access and mobility function (AMF) of a target network, wherein the registration request triggers a mobility registration update procedure;
receiving a 5G Global Unique Temporary Identifier (5G-GUTI) and Network Identifier (NID) information of a source network, wherein the source network is a stand-alone non-public network (SNPN) identified by a Public Land Mobile Network (PLMN) ID and a NID;
determining a source AMF using the received 5G-GUTI and the NID information; and
performing the mobility registration update procedure for the UE, wherein the target AMF acquires UE context information from the source AMF.

12. The method of claim 11, wherein the NID information refers to an entire NID value or a partial NID value of the SNPN.

13. The method of claim 11, wherein the 5G-GUTI comprises a Global Unique AMF Identifier (GUAMI) and a 5G Temporary Mobile Subscriber Identifier (TMSI), wherein the GUAMI further comprises a Public Land Mobile Network (PLMN) ID and an AMF identifier.

14. The method of claim 13, wherein the PLMN ID further comprises a mobile country code (MCC) and a mobile network code (MNC), and wherein the MCC is not globally unique when assigned by the SNPN.

15. The method of claim 11, wherein the registration request comprises the NID information only when the 5G-GUTI is assigned by the SNPN.

16. The method of claim 11, wherein the target AMF uses both 5G-GUTI and the NID information to find a source AMF of the SNPN that assigns the 5G-GUTI to the UE.

17. The method of claim 16, wherein the target AMF sends a message to the source AMF requesting for UE context information.

18. The method of claim 16, wherein the target AMF sends a message to the UE requesting for a Subscription Concealed Identifier or Subscription Permanent Identifier (SUCI/SUPI) if the NID is a self-assigned value by the SNPN.

* * * * *